United States Patent
Wang et al.

(10) Patent No.: US 8,467,592 B2
(45) Date of Patent: Jun. 18, 2013

(54) SUBSTRATE MEDIA DISTORTION ANALYSIS

(75) Inventors: Shen-ge Wang, Fairport, NY (US); Beilei Xu, Penfield, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 778 days.

(21) Appl. No.: 12/655,216

(22) Filed: Dec. 23, 2009

(65) Prior Publication Data

US 2011/0150347 A1 Jun. 23, 2011

(51) Int. Cl.
*G06K 9/00* (2006.01)

(52) U.S. Cl.
USPC ............ 382/141; 382/144; 382/145; 382/147; 382/149; 382/151; 382/152

(58) Field of Classification Search
USPC ................. 382/144, 145, 147, 149, 151, 141, 382/152
See application file for complete search history.

(56) References Cited

U.S. PATENT DOCUMENTS

| 5,216,257 A * | 6/1993 | Brueck et al. ................. 250/548 |
| 5,459,578 A * | 10/1995 | Park et al. ..................... 356/618 |
| 5,698,069 A * | 12/1997 | Aiyer et al. ................ 356/239.2 |
| 6,075,893 A * | 6/2000 | Brandstetter et al. ......... 382/199 |
| 6,966,712 B2 * | 11/2005 | Trelewicz et al. ............. 400/76 |

* cited by examiner

*Primary Examiner* — Anand Bhatnagar
*Assistant Examiner* — Soo Park
(74) *Attorney, Agent, or Firm* — Hoffmann & Baron, LLP

(57) ABSTRACT

Embodiments described herein are directed to detecting and/or measuring distortions of substrate media that can occur during a printing process. The distortion can be detected and/or measured using a composite image generated from a reference image having a first periodic pattern and print image, disposed on a test substrate media, having a second periodic pattern. The first and second periodic patterns are specified so that the composite image includes a moiré pattern having moiré fringes resulting from interference between the first periodic pattern associated with the reference image and the second periodic pattern associated with the print image. The moiré fringes can be used to detect and calculate an amount of distortion of the test substrate media.

18 Claims, 15 Drawing Sheets
(12 of 15 Drawing Sheet(s) Filed in Color)

SUBSTRATE MEDIA DISTORTION ANALYSIS

BACKGROUND

1. Technical Field

The presently disclosed embodiments are directed to identifying substrate media distortions that can result from a printing process.

2. Brief Discussion of Related Art

For many printer products, especially production printers, it can be important to characterize paper distortion that occurs during Side 1 printing so that compensation can be applied to align the print on Side 1 with the print on Side 2 of the paper. The compensation can be applied by pre-distorting (e.g., magnifying) the digital images to be disposed on one or both of the sides of the paper prior to printing the digital images on Side 1 and/or Side 2 of the paper. Common distortions that occur to paper can include shrinkage due to fuser heating, and stretching due to some fuser designs.

The distortion of the paper can be different in different directions, and could be of different forms, such as, for example, uniform shrinkage/enlargement, non-uniform shrinkage/enlargement, spatially varying shrinkage/enlargement, and the like. Light weight paper (e.g., 70 gsm) can shrink as much as about 0.3%, or about 600-700 micrometers (μm) in some printing processes. Depending on the environment, the same type of paper can have different amounts of distortion due to paper moisture from ream to ream, day to day, or the settings of the printing device.

For tight registration requirements, the characterization can be performed for all papers used during the printing process, and may be necessary for new reams, for open reams, different environmental conditions, different print settings (e.g., high gloss via higher heat fusing), different print content (e.g., very high/low coverage, coatings, . . . ), and the like. Higher quality production printers tend to provide a process to characterize any paper and input the distortion information to a compensating process. Lower quality printers may have several distortion values stored for common papers and field updates may not be allowed.

SUMMARY

According to aspects illustrated herein, there is provided a method for identifying substrate media distortion in a printing process. The method includes identifying a reference image having a first periodic pattern and identifying a print image having a second periodic pattern. The print image is disposed on a test substrate media using a printing device. The printing device can distort the substrate media on which the print image is disposed. The distortion of the test substrate media alters the print image. The method also includes generating a composite image from the reference image and the print image disposed on the test substrate media. The composite image includes a moiré pattern having moiré fringes resulting from interference between the first periodic pattern associated with the reference image and the second periodic pattern associated with the print image. The moiré fringes are used to detect distortion of the test substrate media.

According to other aspects illustrated herein, there is provided a computer readable medium storing instructions executable by a computing system including at least one computing device, wherein execution of the instructions implements a method for identifying substrate media distortion in a printing process. The method implemented by the execution of the instructions includes identifying a reference image having a first periodic pattern and identifying a print image having a second periodic pattern. The print image is disposed on a test substrate media using a printing device. The printing device can distort the substrate media on which the print image is disposed. The distortion of the test substrate media alters the print image. The method implemented by the execution of the instructions also includes generating a composite image from the reference image and the print image disposed on the test substrate media. The composite image includes a moiré pattern having moiré fringes resulting from interference between the first periodic pattern associated with the reference image and the second periodic pattern associated with the print image. The moiré fringes are used to detect distortion of the test substrate media.

According to further aspects illustrated herein, there is provided a substrate media structure including a reference substrate on which a reference image is disposed and a test substrate on which a print image is disposed. The reference image has a first periodic pattern and the print image has a second periodic pattern. The reference substrate media and the test substrate media are configured to be overlaid to form a composite image. The first periodic pattern and the second periodic pattern are specified to generate a moiré pattern having a moiré fringe in the composite image. A position of the moiré fringe indicates an amount of distortion of the test substrate media.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
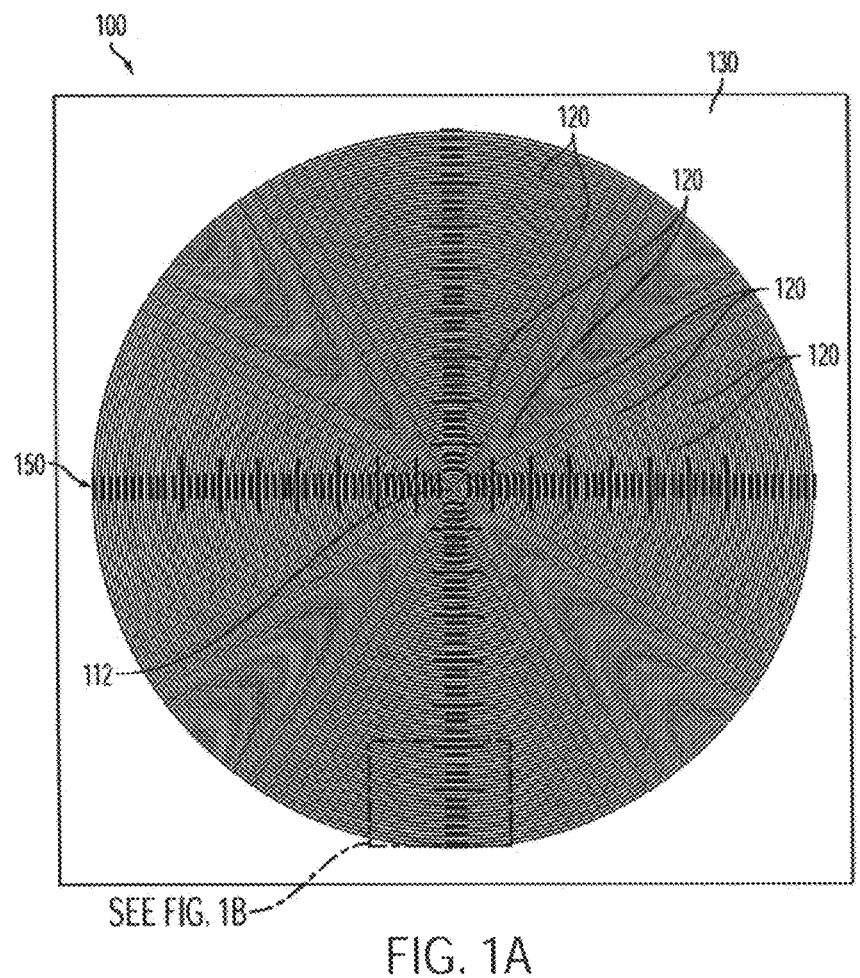
FIG. 1A is an exemplary reference image having a periodic pattern.

Exemplary embodiments are directed to detecting and measuring substrate media distortions resulting from a printing process. To perform the analysis, a composite detection image can be generated using a reference image on a print image that has been disposed on a substrate media to be evaluated. The reference image and the print image can be specified to create a moiré pattern in the composite detection image. Using this composite detection image, the distortion of the substrate media that may have occurred during the printing of the print image on the substrate media can be detected and measured using a moiré fringe analysis. The moiré fringe analysis can be performed based on the moiré fringes of the moiré pattern in the composite detection image.

The reference image and the print image can have periodic patterns having periodicity in the directions for which detection and measurement of distortions to the substrate media is desired. In some embodiments the periodic patterns can be a pattern of concentric circles with increasing radii. Circular patterns can facilitate detection and measurement of substrate media distortions at all angles and directions on the substrate media under evaluation.

Position detection or fringe counting can be aided by using colors in the patterns, reference lines within the patterns, and/or choice of frequency for the patterns. In some embodiments, detection and measurement of the substrate media distortion can be accomplished electronically using, for example, a scanning device and computing device. In some embodiments, a user can use the composite detection image to manually detect and measure the substrate media distortion. Based on the detected and measured substrate media distortion, parameters of a printing device, which are used to print the print image, can be calibrated to compensate for the distortion that occurs to the substrate media during the printing process. Detecting and measuring the distortion using the composite detection image can facilitate a quick visual check to ensure that current distortion assumptions are reasonable. Quick checks for reasonableness can be important in settings such as adding new reams of paper, change in environmental conditions, or use of a similar, but different type of substrate media.

As used herein, "substrate media" refers to paper, transparencies, parchment, film, fabric, plastic, or other substrates on which information can be printed or disposed. A transparency refers to a substrate media formed from a transparent material, where transparent refers to a clear material through which light is permitted to pass such that one can see substantially through the material. A "reference substrate media" is a substrate media on which a reference image is disposed. A "test substrate media" is a substrate media on which a print image is disposed.

As used herein, "distortion" refers to a deformation or change in one or more parameters associated with an object or thing. An example of a distortion is a deformation of a substrate media from a printing process, where the dimensions of the substrate media change as a result of the printing process. Such distortion is referred to herein as "substrate media distortion".

As used herein, "magnification" is a type of distortion and refers to enlargement or shrinkage of an image as the result of substrate media distortion or as the result of compensation for the substrate media distortion. A measure of distortion can be a distortion factor, or magnification factor, m.

As used herein, a "reference image" refers to an image with a periodic pattern specified for use in detecting distortion of one or more test substrate media in conjunction with a print image. As used herein, a "print image" refers to a test image with a periodic pattern specified for use in conjunction with a reference image. Reference images and print images are specified to generate a composite image that has a moiré pattern.

As used herein, a "periodic pattern" refers to a repetitive pattern having a specified frequency and/or period.

As used herein, "concentric circles" refer to two or more circles having a substantially identical center point and different radii such that the circles do not touch or otherwise intersect.

As used herein, "spaced apart" refers to being separated such that one object or thing does not touch another object or thing.

As used herein, a "reference marker" refers to an indicator included in a reference image and/or a print image to facilitate alignment of the reference image and the print image with respect to each other, and/or to facilitate detection and/or measurement of substrate media distortions.

As used herein, a "digital representation" refers to representing data, such as images in a computer-based format, which can be used by a computing device to render the data on a display or print the data on a substrate media.

As used herein, "printing" or "disposing" refers to transferring an image onto a substrate media using a printing process.

As used herein, "detecting" refers to discovering or identifying the existence of something. For example, discovering or identifying the existence of distortion of a substrate media.

As used herein, an "amount" refers to a quantity or size and can be represented as a number, ratio, percentage, and the like.

As used herein, "calculating" refers to determining, ascertaining, or computing using mathematical methods.

As used to herein, "compensation" or "calibration" refers to offsetting, adjusting, or counterbalancing the effects of something on something else. For example, compensation can be applied to a printing device to offset, adjust, or counterbalance distortions to substrate media resulting from the printing device.

As used herein, a "composite detection image" or "composite image" refers to an image generated for detecting and/or measuring substrate media distortion. A composite detection image is generated using a reference image and a print image.

As used herein, a "composite substrate media structure" refers to two or more substrate media that are aligned in an overlapping manner.

As used herein, a "moiré pattern" refers to an artifact in an image causing moiré fringes, which may be periodically distributed throughout the image. A "moiré fringes" is a visual banding effect resulting from interference produced by overlaid periodic patterns.

As used herein, a "position" refers to a location or place relative to another location or place.

As used herein, "interference" refers to an interaction between periodic patterns.

As used herein, "process direction" refers to a direction in which substrate media is processed through a printing device and "cross-process direction" refers to a direction substantially perpendicular to the process direction.

As used herein, "overlaying" refers to placing one object or thing over another object or thing. Overlaying can be achieved by physically placing one object or thing over another object or thing or can be achieved in a computing environment where the objects or things are represented using digital representations.

As used herein, "aligning" refers to positioning one object or thing with respect to another object or thing. For example, a reference image can be aligned with a print image using reference markers in the reference and print images, where the reference markers of the reference image can be positioned to substantially coincide with the reference markers of the print image.

As used herein, "test frequency" refers to a frequency of a periodic pattern in the print image, where $v_t$ represents the specified test frequency and $v_t'$ represents the frequency of the periodic pattern of a distorted print image. A "test period" is the inverse of the test frequency such that $p_t$ is the inverse of $v_t (p_t=1/v_t)$ and $p_t'$ is the inverse of $v_t'(p_t'=1/v_t')$.

As used herein, "reference frequency" refers to a frequency of a periodic pattern in the reference image, where $v_r$ represents the specified reference frequency. A "reference period" is the inverse of the reference frequency such that $p_r$ is the inverse of $v_r(p_r=1/v_r)$.

As used herein, "moiré frequency" refers to a frequency for which a moiré pattern repeats in a composite image. A "nominal moiré frequency" or "$v_m$" is the frequency of the moiré pattern in the composite image when the substrate media on which a print image is disposed is undistorted and "$v_m'$" refers to a moiré frequency when the substrate media on which the print image is disposed is distorted. A moiré period is the inverse of the moiré frequency such that the nominal moiré period $p_m$ is the inverse of the nominal moiré frequency $v_m(p_m=1/v_m)$ and a moiré period upon distortion $p_m'$ is the inverse of the moiré frequency upon distortion $v_m'(p_m'=1/v_m')$.

As used herein, the change in the moiré period due to substrate media distortion $\Delta p_m$ is the difference between the moiré period upon distortion $p_m'$ and the nominal moiré period $p_m(\Delta p_m=p_m'-p_m)$.

A "printing device" refers to an electronic device that uses a printing process to print or otherwise dispose images on substrate media. A "printing process" is a process by which an image is printed or disposed on a substrate media. Some examples of a printing process include an "electrostatographic process", which refers to forming and using electrostatic charged patterns to record and reproduce information, a "xerographic process", which refers to the use of a resinous powder on an electrically charged plate to record and reproduce information, an ink jet process, laser printing process, a liquid ink process, a solid ink process, and the like.

Figure 1B:
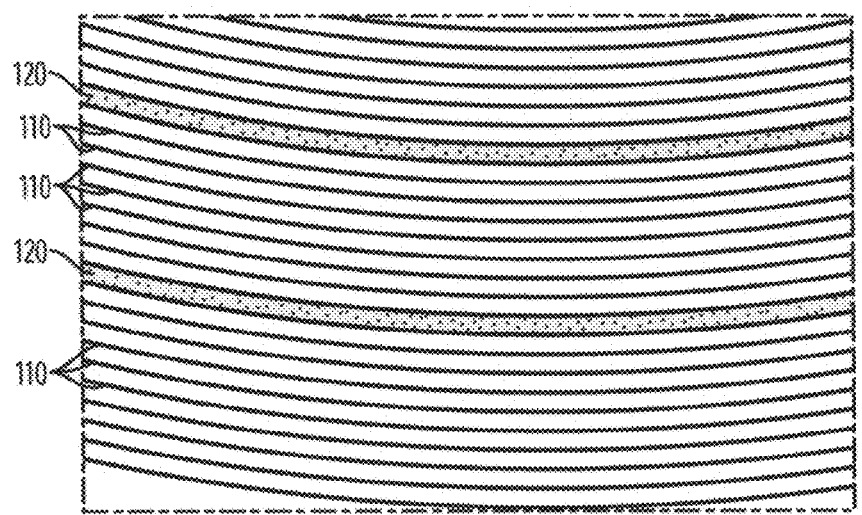
FIG. 1B is a magnified view of a portion of the reference image shown in FIG. 1.

FIG. 1A shows an exemplary reference image 100 that can be generated and used to perform a moiré fringe analysis. FIG. 1B shows a magnified view of a portion of the reference image 100. Referring to FIGS. 1A and 1B, the reference image 100 can have a periodic pattern designed to ensure detection and measurement of distortion of a substrate media on which a print image is disposed during a printing process. In the present embodiment, the reference image 100 is formed by coaxial concentric reference circles 110 radiating from a center point 112. The concentric reference circles 110 can be spaced in the radial direction from the center point of the reference image 100. The spacing can be specified to achieve a desired reference frequency $v_r$ or reference period $p_r$, where the reference period $p_r$ is the inverse of the reference frequency $v_r(p_r=1/v_r)$. In the present example, the reference frequency $v_r$ is 23.75 cycles/inch (cy/in) and the reference period $p_r$ is 0.0421 inches (in.). The reference period $p_r$ identifies the spacing between adjacent concentric reference circles 110 in the radial direction.

The reference image 100 can include reference markers 120 spaced radial about the center point 112 of the reference image 100 in a coaxial manner. The position of the reference markers 120 can be specified to provide reference points for use when performing a distortion analysis using a composite image generated using the reference image and the print image disposed on the substrate media under evaluation. The reference markers 120 can be hashed lines, points, concentric rings having a distinguishing color, line weight, pattern, and the like, to allow a user to identify the reference markers 120.

In some embodiments, the reference image 100 can be stored in a digital form and can be displayed to a user via a computing device and/or can be printed to a substrate media. In some embodiments, the reference image can be disposed on a substrate media 130, such as, for example, a transparency, which can be formed using a transparent material, where transparent refers to a clear material through light is permitted to pass such that one can see substantially through the material. The substrate media 130 on which the reference image can be disposed can have little or no distortion from the printing process, or can have a know distortion that can be easily calibrated.

In some embodiments, the reference image 100 can include a ruler 150 with an origin at the center point 112 of the reference image 100. The ruler can include substantially even space ticks or hash marks that can used to detect and measure the position of moiré fringes in a composite generated using the reference image. The ruler can aid in visual inspection of a composite image to facilitate shifts of the moiré fringes due to substrate media distortion and can provide an embedded tool for measuring the distance a moiré fringe has shifted as a result of the moiré fringes.

While the reference image 100 is formed from concentric circles, those skilled in the art will recognize that other patterns can be implemented to facilitate detection and measurement of substrate media distortion. For example, referring to FIG. 2, an arcuate pattern can extend outward from a center point 210 along an x-axis 212 and a y-axis 214. This pattern 200 can facilitate detection and measurement of substrate media distortion along the x-axis and y-axis of the substrate media on which a print image is disposed. Furthermore, the patterns can be arranged in a manner that allows other material to be included, such as color calibration targets. In some embodiments, linear patterns can be used that have repetitive patterns of linear lines.

Figure 3A:
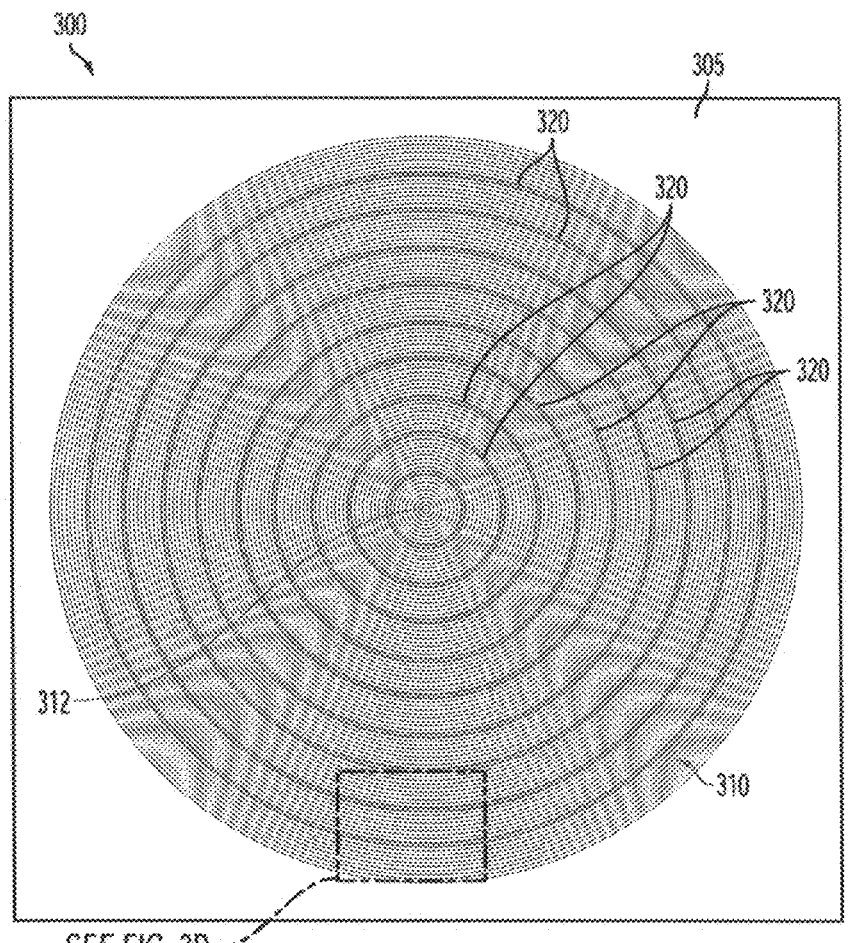
FIG. 3A is exemplary undistorted print image having a periodic pattern.
Figure 3B:
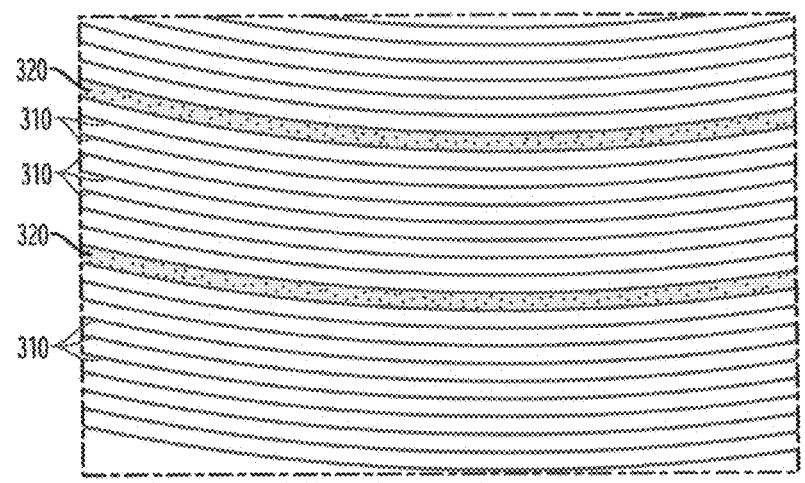
FIG. 3B is a magnified view of a portion of the undistorted print image shown in FIG. 3A.

FIG. 3A shows an exemplary print image 300 that can be disposed on a substrate media 305 using a printing device. FIG. 3B shows a magnified view of a portion of the print image 300. In the present example, with reference to FIGS. 3A and 3B, the substrate media 305 can experience little or no distortion from the printing process such that the print image 300 disposed on the substrate media 305 are substantially identical to the digital version of the print image stored in a computer readable medium. The print image 300 can have a periodic pattern designed to ensure detection and measurement of distortion of the substrate media 305 on which the print image 300 is disposed. In the present embodiment, the print image 300 is formed by concentric reference circles 310 radiating from a center point 312. The concentric reference circles 310 can be spaced in the radial direction from the center point 312 of the print image 300. The spacing between the concentric reference circles can be specified to achieve a desired test frequency $v_t$ or test period $p_t$, where the test period $p_t$ is the inverse of the test frequency $v_t(p_t=1/v_t)$. In the present example, the print image can be specified to have a test frequency $v_t$ of 25 cycles/inch (cy/in) and a test period $p_t$ of 0.040 inches (in.). The test period $p_t$ identifies the spacing between each concentric reference circle 310 in the radial direction.

The print image 300 can include reference markers 320 spaced radial about the center point 312 of the print image 300 in a coaxial manner. The position of the reference markers 320 provide a reference point to assist in aligning the print image and reference image to generate a composite detection image and for detecting and/or measuring distortions of the substrate media on which the print image is disposed.

For example, generating a composite image can be aided by aligning reference markers of the reference image and the print image. In some embodiments, reference markers that are closer to the center points of the reference image and the print image can be used to center the reference pattern with respect to the print image because location of the reference markers near the center points of the images can be affected less by distortions. In some embodiments, reference markers farther away from the center points of the reference and print images can be used to facilitate angular alignment of the reference images and the print images.

The print image can be composed using colors to enhance the moiré pattern resulting in the composite detection image generated using the reference image and the print image so that the moiré fringes of the moiré pattern are more readily identified. For example, the colors used for the print image can be chosen so that the moiré fringes are a desired color. In one embodiment, the pattern of the print image (e.g., the concentric circles) can be the color magenta and can result in moiré fringes of the composite detection image to be the color magenta when the reference image is in black and white. Likewise, the reference markers of the print image and/or the reference image can be in color so that the location of the reference markers is more noticeable. For example, the reference markers can be the color yellow.

Figure 4:
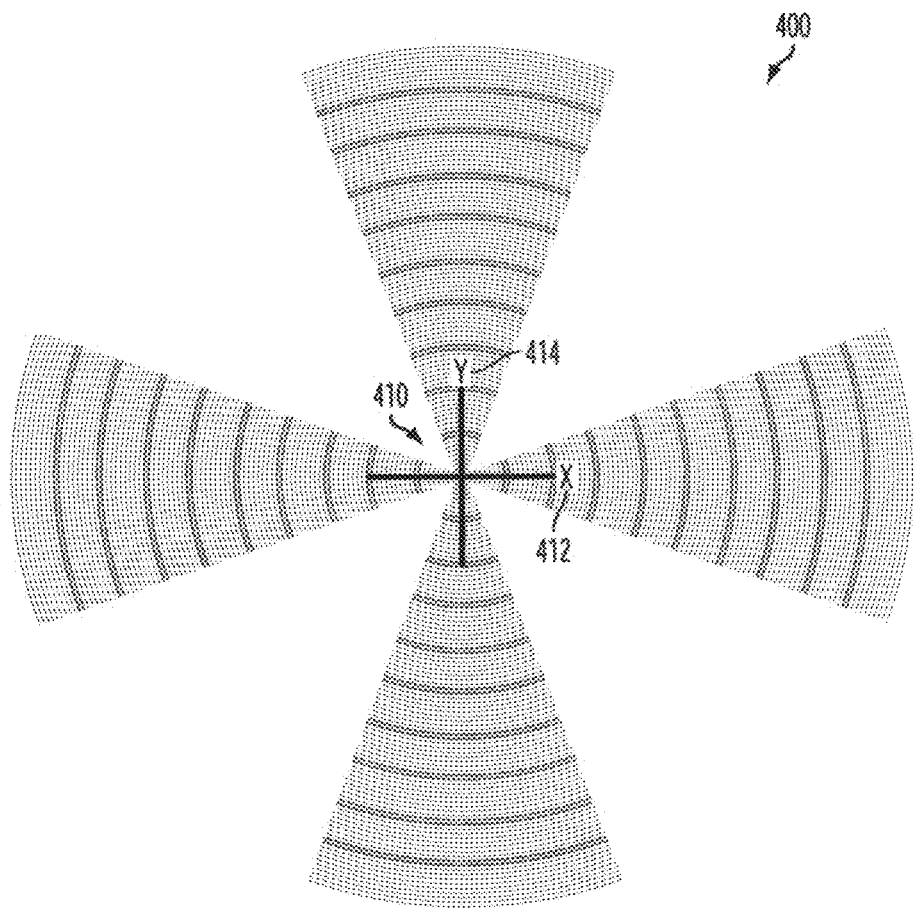
FIG. 4 is another exemplary undistorted print image having a periodic pattern.

While the print image 300 is formed from concentric circles, those skilled in the art will recognize that other patterns can be implemented to facilitate detection and measurement of substrate media distortion. For example, referring to FIG. 4, an arcuate pattern 400 can extend outward from a center point 410 along an x-axis 412 and a y-axis 414. This pattern can facilitate detection and measurement of substrate media distortion along the x-axis and y-axis of the substrate media 305. In some embodiments, a linear periodic pattern having linear lines can be employed and positioned on the page in an appropriate position given the circumstances. In some embodiments, it can be desirable to have several reference frequencies running in each direction of interest. Moiré fringe analysis can be performed on using each of the frequencies and the outcome can be averaged, or just the frequencies can be used that provide the clearest reading. Furthermore, the patterns can be arranged in a manner that allows other material to be included, such as color calibration targets.

Figure 2:
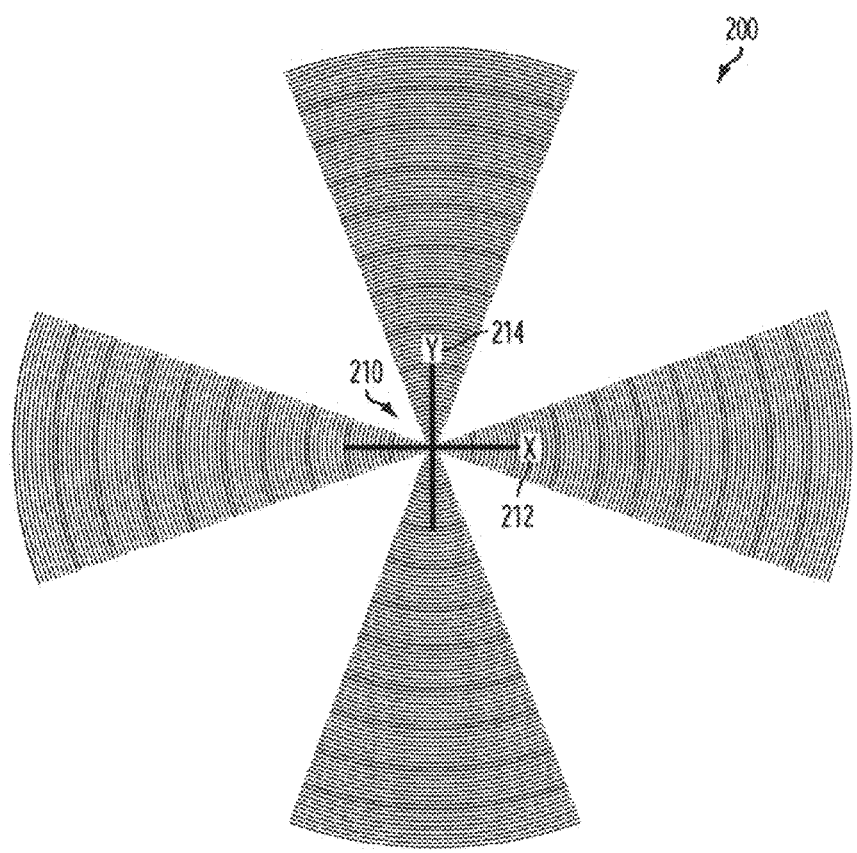
FIG. 2 is another exemplary reference image having a periodic pattern.
Figure 5A:
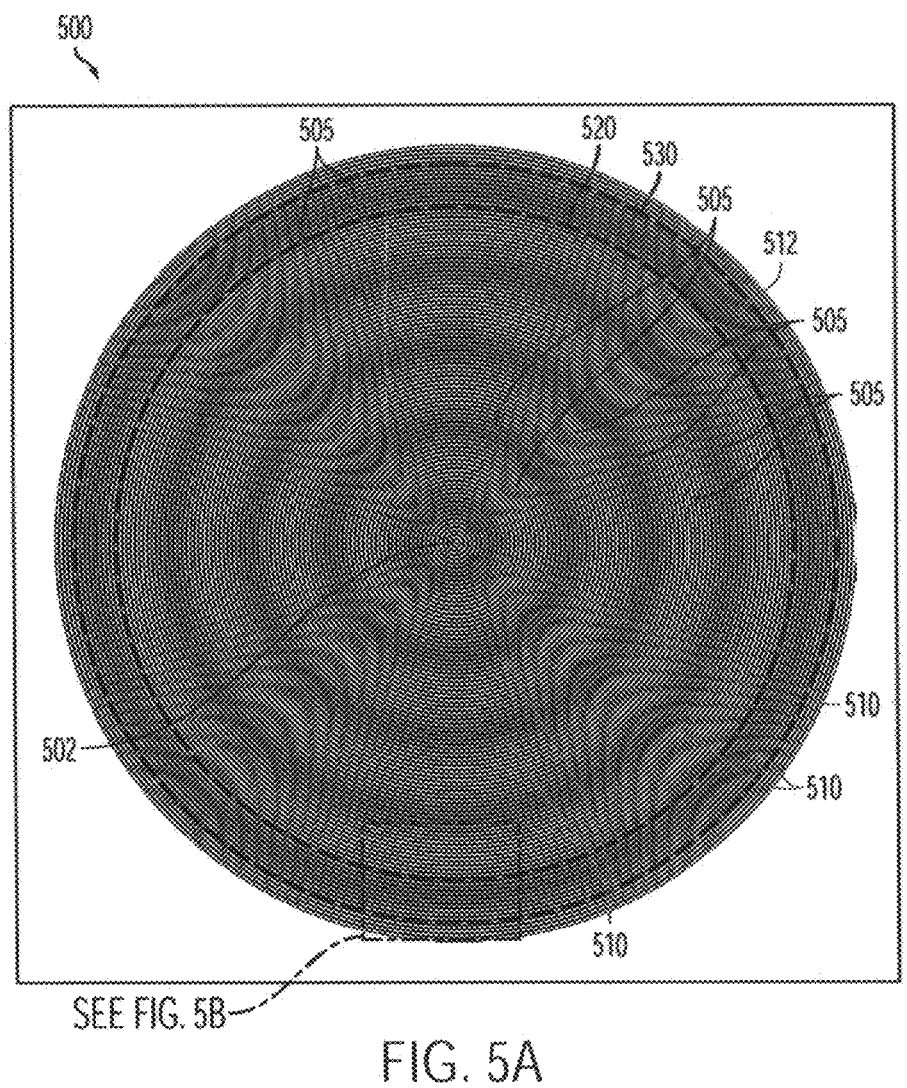
FIG. 5A is an exemplary composite image generated based on the reference image of FIG. 1 and the print image of FIG. 3.
Figure 5B:
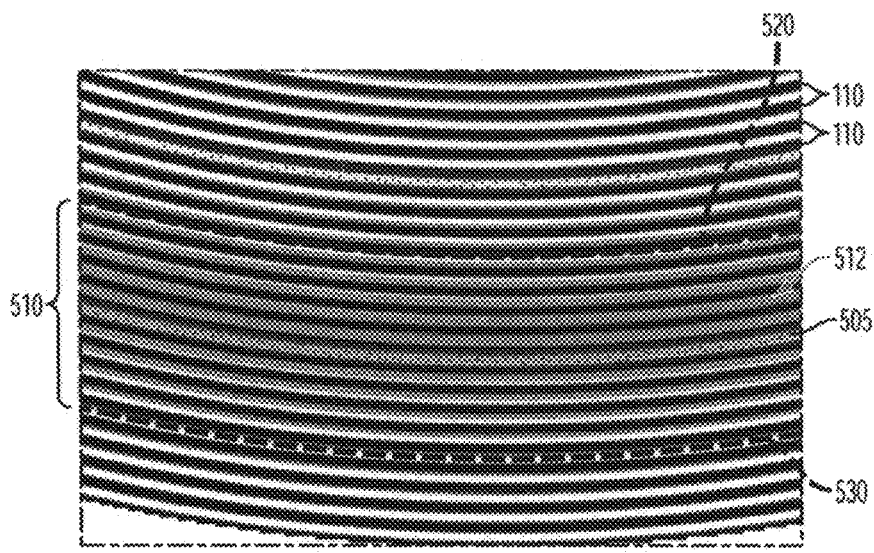
FIG. 5B is a magnified view of a portion of the composite image shown in FIG. 5A.

FIG. 5A shows a composite detection image 500 (hereinafter "composite image 500") generated using the reference image 100 (FIG. 1) and the print image 300 (FIG. 3) as a nominal case when there is no substantial distortion of the substrate media on which the print image 300 is disposed. FIG. 5B shows a magnified view of a portion of the composite image 500. While the composite image of the present example is generated using periodic patterns having concentric circles, those skilled in the art will recognize different types of periodic patterns can be used for the print image and/or the reference image. For example, the print image can have a periodic pattern of concentric circles (FIG. 3) and the reference image can have an arcuate periodic pattern (FIG. 2).

In the present embodiment, with reference to FIGS. 5A and 5B, the reference image 100 overlays the print image 300 so that the reference markers 120 of the reference image 100 and the reference markers 320 of the print image 300 are substantially aligned. The reference frequency and the test frequency can be specified to aid and/or enable detection of shifting of the moiré fringes in the composite image 500. In this example, the reference frequency $v_r$ of the reference image is 23.75 cy/in and test frequency $v_t$ of the print image is 25 cy/in. The reference and test frequencies used in the present example result in the composite image 500 having roughly five moiré fringes from the center point of the composite image 500 to edge of composite image 500. If the reference and test frequencies were specified to be identical, magnification changes (e.g., distortions) would cause the fringe frequency to vary around 0 cy/in. This typically would be much larger than a substrate media, such as a sheet of paper, and therefore, it would be difficult to detect and evaluate substrate media distortion. Since the print image 300 disposed on the substrate media is undistorted, the test frequency $v_t$ is substantially equal to the specified frequency of 25 cy/in.

The composite image 500 includes a moiré pattern having moiré fringes 510. The moiré fringes 510 are formed from interference between the concentric reference circles of the reference image 100 and the print image 300. In the present example, the moiré fringes 510 appear as concentric bands centered about reference markers 505 in the composite image 500, which can be the reference markers 120 and/or the reference markers 320. The moiré pattern of the composite image 500 has a nominal moiré frequency $v_m$, of 1.25 cy/in or a nominal moiré period $p_m$ of 0.8 in., which result, in this example, in five moiré fringes 510. Having moiré fringes that are centered about the reference markers indicates that the substrate media, on which the print image 300 is disposed, was substantially undistorted after the printing process used to dispose the print image 300 on the substrate media 305 was performed. In the present example, illustrative bands 520 are used to demarcate the boundary of the outermost one of the moiré fringes 510. Distortions associated with the print image can be detected by visual examination of a moiré fringe by examining the position of center of the moiré fringe with respect to a reference marker.

In some embodiments, the reference circles of the reference image and the print image that are closer to the center can be omitted from the patterns, since the outermost moiré fringe can be used to detect and measure distortions of the print image more effectively as the outermost moiré fringes can have larger shifts than the innermost moiré fringes. In some embodiments, distortions can be detected and measured using several moiré fringes, where the measurements of the moiré fringes can be averaged to calculate the average affect of the distortion.

In some embodiments, the reference frequency $v_r$ and/or the test frequency $v_t$ can be higher or lower. Lower frequencies can generate wider moiré fringes in a composite detection image. Higher frequencies generate narrower moiré fringes. Narrower moiré fringes can facilitate an easier identification of the center of the moiré fringes. Also, accurate measurement via moiré fringe counting is better enabled by narrower moiré fringes.

When a substrate media is distorted during the printing process, the test frequency of the print image can be altered by the distortion such that the actual test frequency of the print image disposed on the substrate media is greater than, or less than, the specified test frequency. The change in frequency can be directional depending on how the distortion is manifested so that, for example, the test frequency along the process direction of the substrate media remains unchanged, but the test frequency along the cross-process direction of the substrate media can be changed. As one example, the substrate media can be a sheet of paper that is stretched or shrunk in one more directions by the printing process, which can result in the distortion of the print image being disposed on the paper.

Figure 6A:
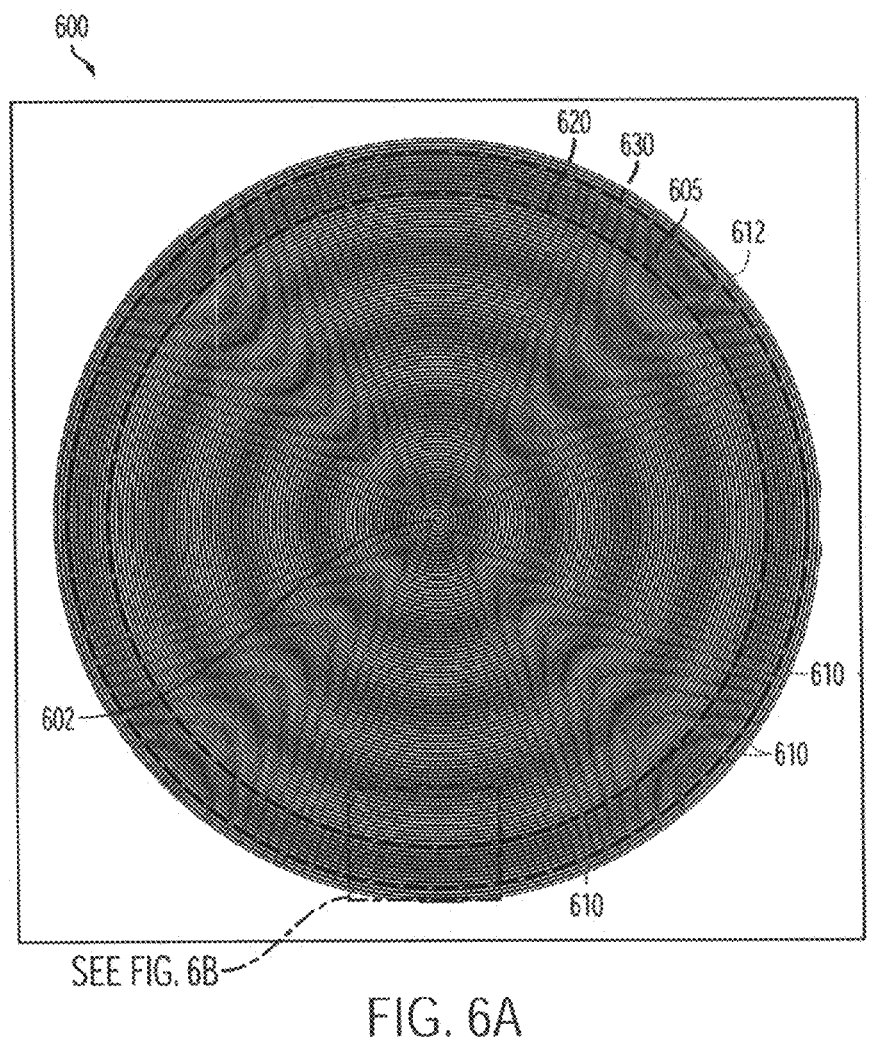
FIG. 6A is an exemplary composite image generated based on the reference image of FIG. 1 and a distorted print image.
Figure 6B:
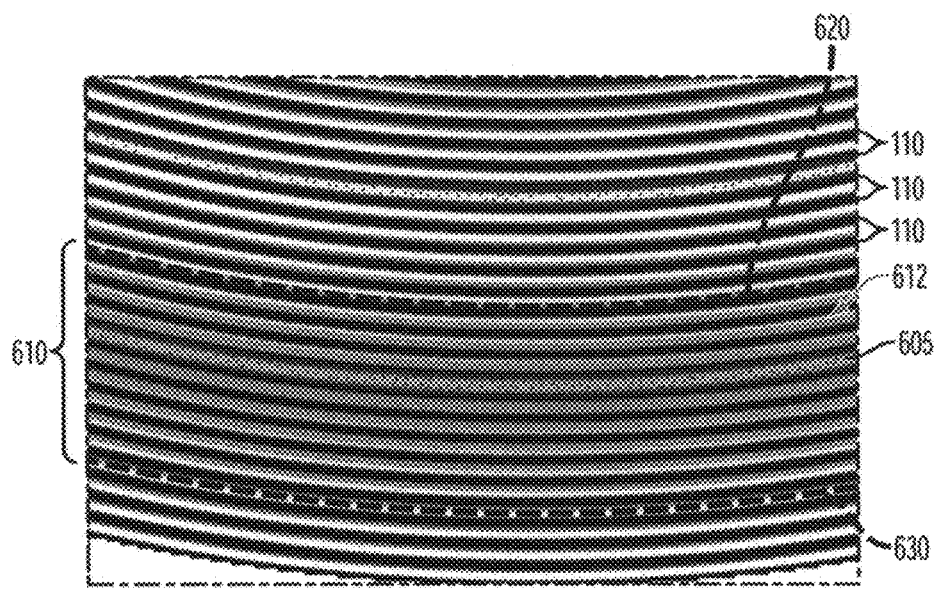
FIG. 6B is a magnified view of a portion of the composite image shown in FIG. 6A.

FIG. 6A shows a composite image 600 generated using the reference image 100 of FIG. 1 and the print image 300 disposed on a substrate media that has been distorted by the printing process. FIG. 6B shows a magnified view of a portion of the composite image 600. In the present example, with reference to FIGS. 6A and 6B, the substrate media, and therefore, the print image 300, has been stretched by the printing device by 0.1% in the process direction and the cross-process direction.

When the print image 300 disposed on substrate media that stretches in one or more directions from the printing process the print image 300 is also stretched such that the print image 300 can be larger than the nominal case where the print image is undistorted. As a result, the test frequency $v_t'$ of periodic pattern (e.g., the concentric circles) in the distorted print image 300 is reduced so that the test frequency $v_t'$ is lower than the test frequency $v_t$ of the nominal undistorted print image (e.g., less than 25 cy/in.) in one or more directions. The test period $p_t'$ of the distorted print image is increased as compared to the test period $p_t$ of the nominal undistorted print image (e.g., greater than 0.040 in.), in the one or more directions. Under these circumstances, the print image has a distortion factor m that is greater than one, where a distortion factor of one represents a nominal undistorted print image. This can be expressed mathematically as follows:

For $v_r < v_t$ and m>1:

$$|v_r - v_t| > |v_r - v_t'|,$$

hence $v_m > v_m'$, where $v_t'$ represents the distorted test frequency associated with the distorted print image and $v_m'$ represents the moiré pattern frequency when the distorted print image is used to generate the composite image 600. As a result of the stretching of the substrate media on which the print image 300 is disposed, moiré fringes of the composite image 600 have shifted outward away from the center point 602 as compared to the moiré fringes 510 of the nominal case shown in FIG. 5. As a result, the outermost moiré fringe 612 is closer to the edge of the composite image 600. While any of the moiré fringes 610 can be used to detect and measure distortion of a substrate media, the outermost moiré fringe 612 is convenient for use in analysis because the movement of the outermost moiré fringes may be more readily discernable. In the present example, the outermost moiré fringe 612 has shifted outward by two of the concentric reference circles 110 of the reference image 100 such that the moiré fringes are not centered about reference markers 605 in the composite image, which can be the reference markers of the reference image and/or the reference markers of the print image. Illustrative bands 620 and 630 are provided to demarcate the boundaries of the moiré fringe 612.

Figure 7A:
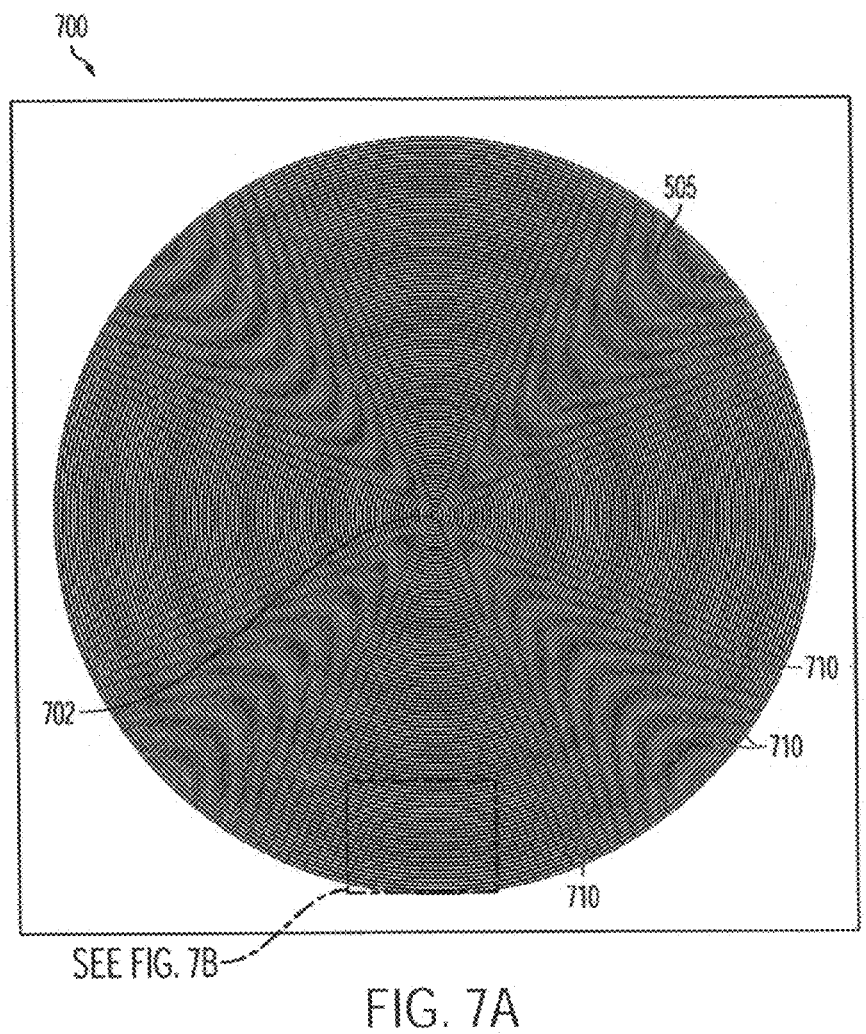
FIG. 7A is another exemplary composite image generated based on the reference image of FIG. 1 and a distorted print image.
Figure 7B:
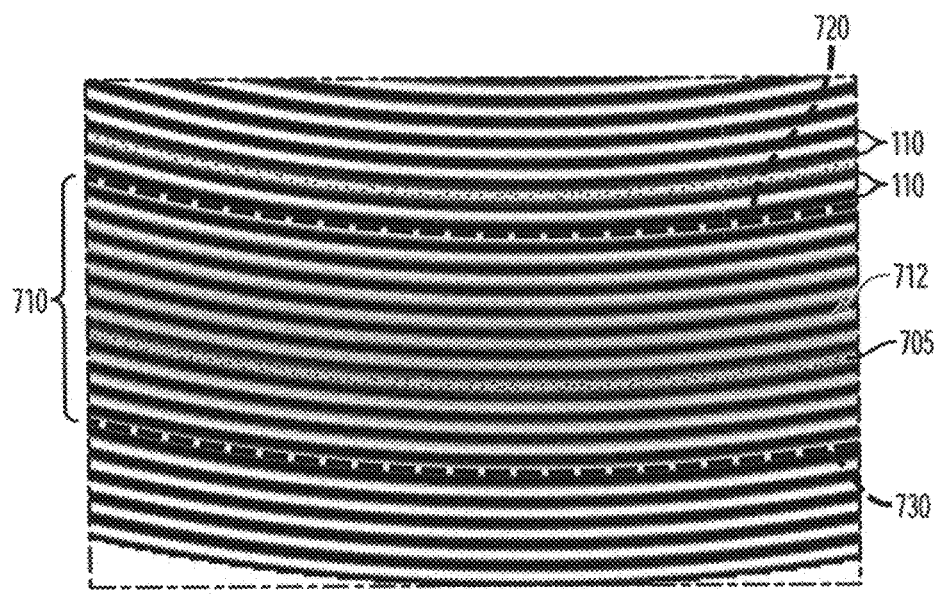
FIG. 7B is a magnified view of a portion of the composite image shown in FIG. 7A.

FIG. 7A shows a composite image 700 generated using the reference image 100 of FIG. 1 and a print image 300 disposed on a substrate media that has been shrunk by the printing process by 0.1% in process direction and the cross-process direction. FIG. 7B shows a magnified view of a portion of the composite image 700. In the present example, with reference to FIGS. 7A and 7B, the substrate media, and therefore, the print image has been shrunk by the printing device.

When the print image 300 disposed on substrate media that shrinks in one or more directions from the printing process, the print image 300 also shrinks such that the print image 300 can be smaller than the nominal case in which the print image is undistorted. As a result, the test frequency $v_t'$ of periodic pattern (e.g., the concentric rings) in the distorted print image is increased so that the test frequency $v_t'$ of the distorted print image 300 is higher than the test frequency $v_t$ of the nominal undistorted print image 300 (e.g., greater than 25 cy/in. when 25 cy/in represents the nominal test frequency) in one or more directions. The test period $p_t'$ of the distorted print image decreases as compared to the test period $p_t$ of the nominal undistorted print image 300 (e.g., less than 0.040 in. when 0.040 in. represents the nominal test period) when the substrate media, on which the print image 300 is disposed shrinks, in the one or more directions. Under these circumstances, the print image 300 has a distortion factor m that is less than one, where a distortion factor m of one represents a nominal undistorted print image. This can be expressed mathematically as follows:

For $v_r < v_t$ and m<1:

$$|v_r - v_t| < |v_r - v_t'|,$$

hence $v_m < v_m'$, where $v_t'$ represents the distorted test frequency associated with the distorted print image and $v_m'$ represents the moiré pattern frequency when the distorted print image is used to generate the composite image. The shrinkage of the substrate media on which the print image is disposed causes moiré fringes 710 of the composite image 700 have shifted inward toward the center point 702 as compared to the moiré fringes 510 of the nominal case shown in FIG. 5. As a result, the outermost moiré fringe 712 is further away from the edge of the composite image. In the present example, the outermost moiré fringe 712 has moved inward by two of the concentric reference circles 110 as compared to the nominal case such that the moiré fringes are not centered about reference markers 605, which can be the reference markers of the reference image and/or the reference markers of the print image. While any of the moiré fringes 710 can be used to detect and measure distortion of a substrate media, the use of the outermost moiré fringe 712 is convenient because the movement of the outermost moiré fringes may be more readily discernable. Illustrative bands 720 and 730 are provided to demarcate the boundaries of the moiré fringe 712.

The distortion of substrate media in a given direction is directly proportional to the moiré fringe movement in that direction. Hence, a measurement of the amount of movement can be used to determine the amount of distortion. For a given distance D along a substrate media (e.g., a substrate media on which a print image is disposed), the number of undistorted test periods printed on the substrate $N_t$ is given by $$N_t = D/p_t \quad (1)$$

Within the same distance, the number of reference periods $N_r$ is given by $$N_r = D/p_r \quad (2)$$

The number of the moiré periods $N_m$ for undistorted substrate media is the difference of the number of undistorted test periods and the number of reference periods, $$N_m = N_t - N_r. \quad (3)$$

When the printed image is distorted (e.g., the print image disposed on the substrate media), the number of test frequency periods in the distance D changes to $N_t'$. The corresponding change of the number of the moiré periods is as follows, $$N_m' = N_t' - N_r. \quad (4)$$

The difference between the number of test periods for undistorted media and distorted media for a distance D along the substrate is given by $$\Delta N = N_t' - N_t; \quad (5)$$

where $\Delta N$ represents the change in the number of moiré fringes at position D due to the distortion. The distortion factor m in can be written as $$m = N_t/N_t', \tag{6}$$

considering that the difference $\Delta N$ is typically much smaller than the number of periods $N_t$ and $N_t'$, Eqs. (5) and (6) can be used and the distortion factor can be expressed as $$m = 1 - \Delta N/N_r. \tag{7}$$

In other words, the distortion of substrate media in a given direction is directly proportional to the moiré fringe movement in that direction. Those skilled in the art will recognize that there are alternative and useful representations of the relationship between moiré fringes and distortion (e.g., magnification).

For example, distortion of substrate media in a given direction can be calculated based on a difference in moiré period $\Delta p_m$ in the given direction between the moiré period $p_m'$ associated with a distorted print image and the nominal moiré period $p_m$, where the nominal moiré period is specified and, therefore, known. The difference in moiré period $\Delta p_m$ can be measured with reference to one of the reference markers. In some embodiments, the measurement can be formed using, for example, a ruler (scale), computer program, calculating or counting a number of reference periods $p_r$ that a moiré fringe has moved compared to the nominal case (e.g., the composite image generated using an undistorted print image), and the like. By calculating or counting the number of reference periods that the moiré fringe has moved, the distortion factor m, as a function of $\Delta p_m$, can be obtained. The distortion factor m can be calculated mathematically as follows:

$$m = p_t'/p_r \tag{8}$$

A relationship between $\Delta p_m$ and $p_t'$ can be derived as follows:

$$\begin{aligned}
\Delta p_m &= p_m' - p_m = 1/(v_t' - v_r) - p_m \\
&= 1/(1/p_t' - 1/p_r) - p_m \\
&= 1/(p_r/p_r p_t' - p_t'/p_r p_t') - p_m \\
&= p_r p_t'/(p_r - p_t') - p_m
\end{aligned} \tag{9}$$

$$(\Delta p_m + p_m)(p_r - p_t') = p_r p_t'$$

$$(\Delta p_m + p_m)p_r - (\Delta p_m + p_m)p_t' = p_r p_t'$$

$$p_r p_t' + (\Delta p_m + p_m)p_t' = (\Delta p_m + p_m)p_r$$

$$p_t'[p_r + (\Delta p_m + p_m)] = (\Delta p_m + p_m)p_r$$

$$p_t' = (\Delta p_m + p_m)p_r / [p_r + (\Delta p_m + p_m)]$$

If the Nth moiré fringe has moved by k periods of length $p_r$, then the change in period is $$\Delta p_m = k p_r/N \tag{10}$$

The distortion factor m can be found by counting k, substituting Eq. (10) into Eq. (9), and then substituting Eq. (9) into Eq. (8). Referring again to FIG. 6, as an example for calculating the distortion factor m, the outermost moiré fringe of composite image 600 can be used to detect a shift of the moiré fringes because detection of the shift can be easier for moiré fringes that are farther away from the center of the composite image. Upon examine the N=4.5 moiré fringe (the outermost moiré fringe in the present example) of the composite image 600, it can be determined that the number of reference periods shifted by two. Therefore, the number k of reference periods $p_r$ is two (k=2) and the Nth moiré fringe is 4.5 (N=4.5). Using Eq. (10), the difference in the moiré period $\Delta p_m$ is 0.018713 in. Substituting the value of the difference in the moiré period $\Delta p_m$ into Eq. (9), the test period $p_t$ of the distorted print image is calculated to be 0.040046 in. Substituting the test period $p_t$ of the distorted print image into Eq. (8), the distortion factor m is calculated to be 1.0011 (approximately a 0.1% magnification).

The above equations were derived assuming that the moiré fringe position is being measured. In some embodiments, the reference image and test image can be selected such that it is easier to determine a number of moiré fringes in a given direction, and analogous formulas could be used to obtain the magnification from the count. The number of moiré fringes per unit area in a given direction is the moiré fringe frequency, which allows the distortion factor m to be derived as follows:

$$m = p_t'/p_t = v_t/v_t' \tag{11}$$

$$v_m = v_t - v_r$$

$$v_t = v_m + v_r \tag{12}$$

$$v_t' = v_m' + v_r \tag{13}$$

Eq. (12) and Eq. (13) can be substituted into Eq. (11) to generate the following representation of the distortion factor m:

$$m = p_t'/p_t = (v_m + v_r)/(v_m' + v_r), \tag{14}$$

where $v_m$ and $v_r$ are specified, and therefore, known by design, and $v_m'$ can be obtained by counting moiré fringes.

While the above derivation is an illustrative example for determining the distortion factor m, those skilled in the art will recognize that other approaches can be used. As one example, differential calculus can be used to derive an expression where the differentials are with respect to change in test frequency $\Delta v_t$ and moiré frequency $\Delta v_m$. Using this approach, differentials between frequency v and period p can be approximated as $dv \approx -dp/p$. As another example, rather than counting a number of reference periods a moiré fringe has shifted using the reference circles, a ruler could be printed on the reference transparency for measuring a distance a fringe has moved.

Figure 8:
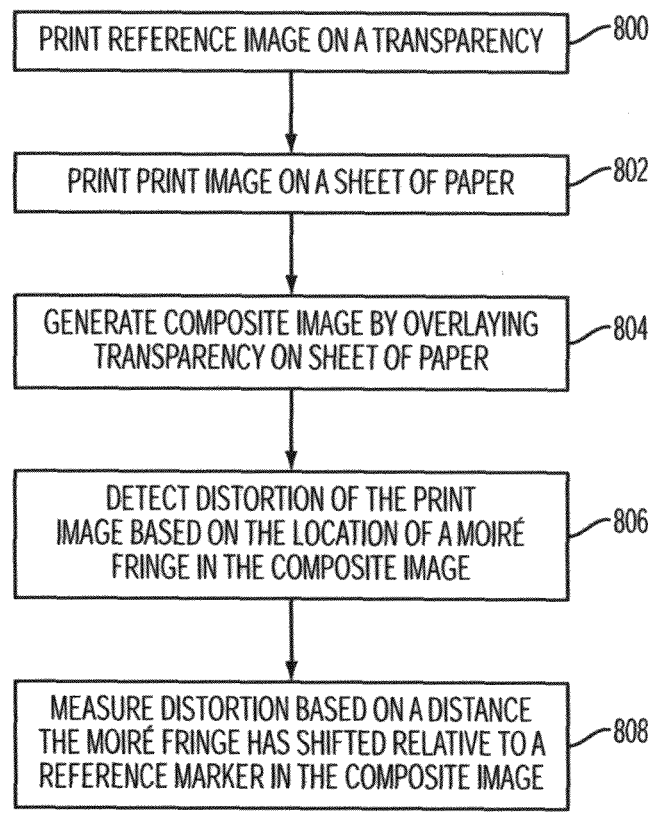
FIG. 8 is a flowchart illustrating an implementation of detecting and measuring substrate media distortion.

FIG. 8 is a flowchart illustrating an exemplary process for detecting and measuring substrate media distortion. A reference image, such as reference image 100 (FIG. 1), is printed on a transparency (800) and a print image, such as print image 300 (FIG. 3) is printed on a sheet of paper (802). A composite image is generated by overlaying the transparency on the sheet of paper so that the center point of the reference image is substantially aligned with the center point of the print image and/or the reference marks of the reference image are substantially aligned with the reference markers of the print image (804). The aligning can be performed using the reference markers of the reference image and the print image that are close to the center points. The reference image and the print image can be formed from periodic patterns having specified pattern frequencies and/or periods. The frequencies and/or periods of the periodic patterns can be specified to generate a moiré fringes positioned relative to one or more of reference markers included in the reference image when the composite image is generated. The distortion of the print image can be detected based on the location of at least one of the moiré fringes relative to at least one of the reference markers (806) and can be measured based on a distance the moiré fringe has shifted relative to the reference marker as compared to the nominal case (808).

Figure 9:
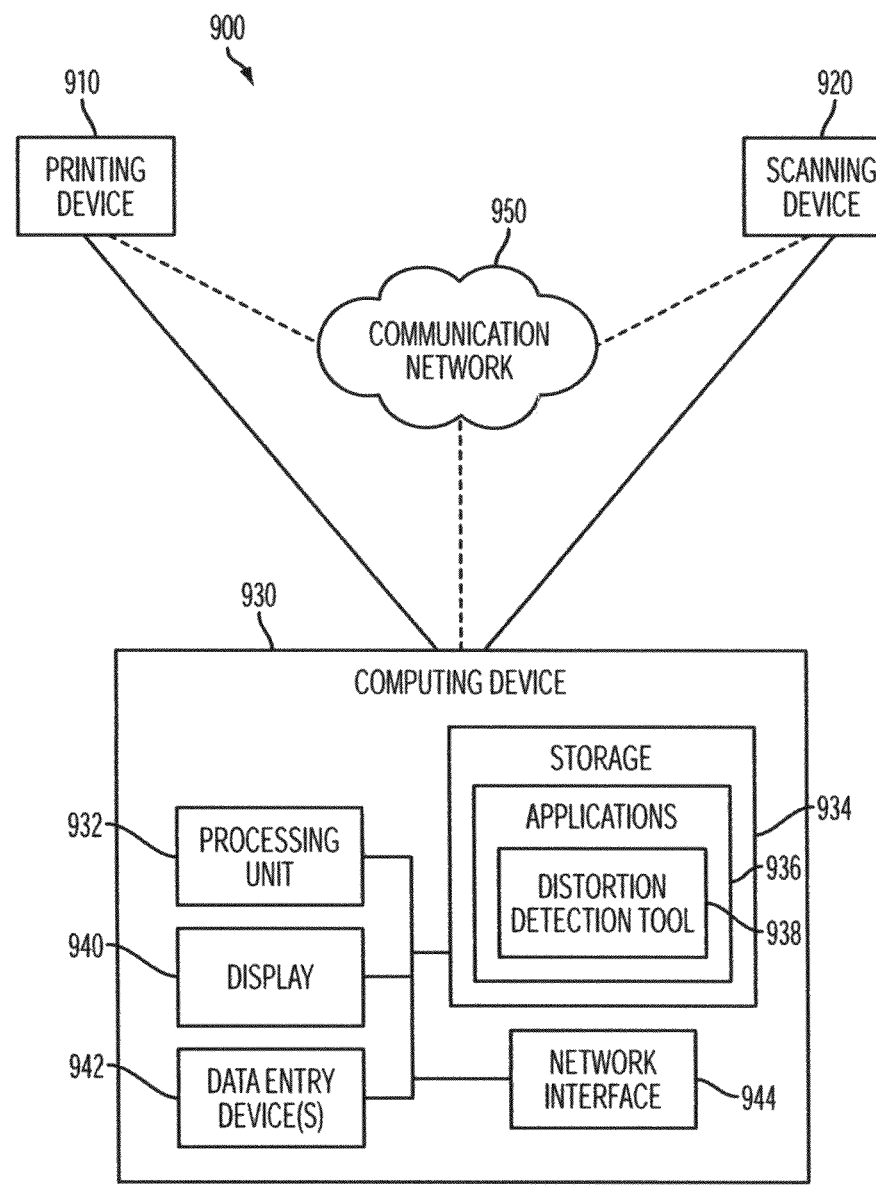
FIG. 9 is an exemplary system for implementing exemplary embodiments for detecting and/or measuring substrate media distortions.

FIG. 9 illustrates an exemplary system 900 configured to implement embodiments for detecting and/or measuring substrate media distortion. The system 900 includes a printing device 910, a scanning device 920, and a computing device 930. The printing device 910 and scanning device 920 can be communicatively coupled to the computing device 930 via one or more cables or via a communication network 950, which can be any network over which information can be transmitted between devices communicatively coupled to the network. For example, the communication network can be the Internet, intranet, Virtual Private Network (VPN), Local Area Network (LAN), Wide Area Network (WAN), and the like.

The printing device 910 can be any device that disposes images on substrate media and can include, for example, printers; copiers; facsimile machines; multi-function device capable of scanning, copying, faxing, and printing; and the like. The printing device 910 can use one or more technologies for disposing images on a substrate media, such as xerography, electrostatography, ink jet, laser printing, liquid ink, solid ink, and the like. In some embodiments, the printing device can include a fuser or other like components for heating and melting toner onto the substrate media. The printing device 910 can be used to print a print image on a substrate media to be evaluated and/or to print a reference image on a substrate media for use in evaluating the substrate media.

The scanning device 920 can be any device that is configured to generate a digital representation of an image disposed on a substrate media. The scanning device 920 can include one or more sensors, such as charge coupled devices (CCDs), complementary metal-oxide semiconductor (CMOS) image sensors, and the like, which can be used to scan substrate media and generate the digital representation of the content disposed on the substrate media (e.g., a print image). The digital representation of a print image resulting from the scan can be substantially identical to the print image disposed on the substrate media such that the actual test frequency of the print image on the substrate media is substantially equal to the test frequency of the print image in the digital representation.

The computing device 930 can be a mainframe, personal computer (PC), laptop computer, workstation, handheld device, such as a portable digital assistant (PDA), and the like. In the illustrated embodiment, the computing device 930 includes one or more processing unit 932, such as a central processing units (CPUs) and/or graphical processing units (GPUs), and can include storage 934. In some embodiments, the computing device 930 can further include or be communicatively coupled to a display device 940 and data entry device(s) 942, such as a keyboard, touch screen, and/or mouse.

The storage 934 stores data and instructions and can be implemented using computer readable medium technologies, such as a floppy drive, hard drive, tape drive, Flash drive, optical drive, read only memory (ROM), random access memory (RAM), and the like. Some examples of data that can be stored include reference images, print images, scanned print images that were disposed on substrate media using the printing device 910, composite images, and the like. Applications 936, such as a distortion detection and measurement tool 938 (hereinafter "tool 938" for detecting and measuring substrate media distortion, or portions thereof, can be resident in the storage 934. The tool 938 can include instructions for identifying a reference image and a print image, generating a composite image using the reference image and a print image, and detecting and measuring substrate media distortion associated with a substrate media on which the print image was disposed during a printing process. The print image and/or reference image can be scanned and stored in the storage 934 using the scanning device 920. The composite image can be generated by overlaying the reference image and the scanned print image. The tool 938 can programmatically align the reference image and the scanned print image to generate the composite image. The storage 934 can be local or remote to the computing device 900. The computing device 900 includes a network interface 944 for communicating with a network, such as the communication network 950.

The one or more processing units 932 operate to run the applications 936, such as the tool 938, in storage 934 by executing instructions therein and storing data resulting from the executed instructions, which may be used for calibrating the printing device 910 to compensate for substrate media distortion.

Figure 10:
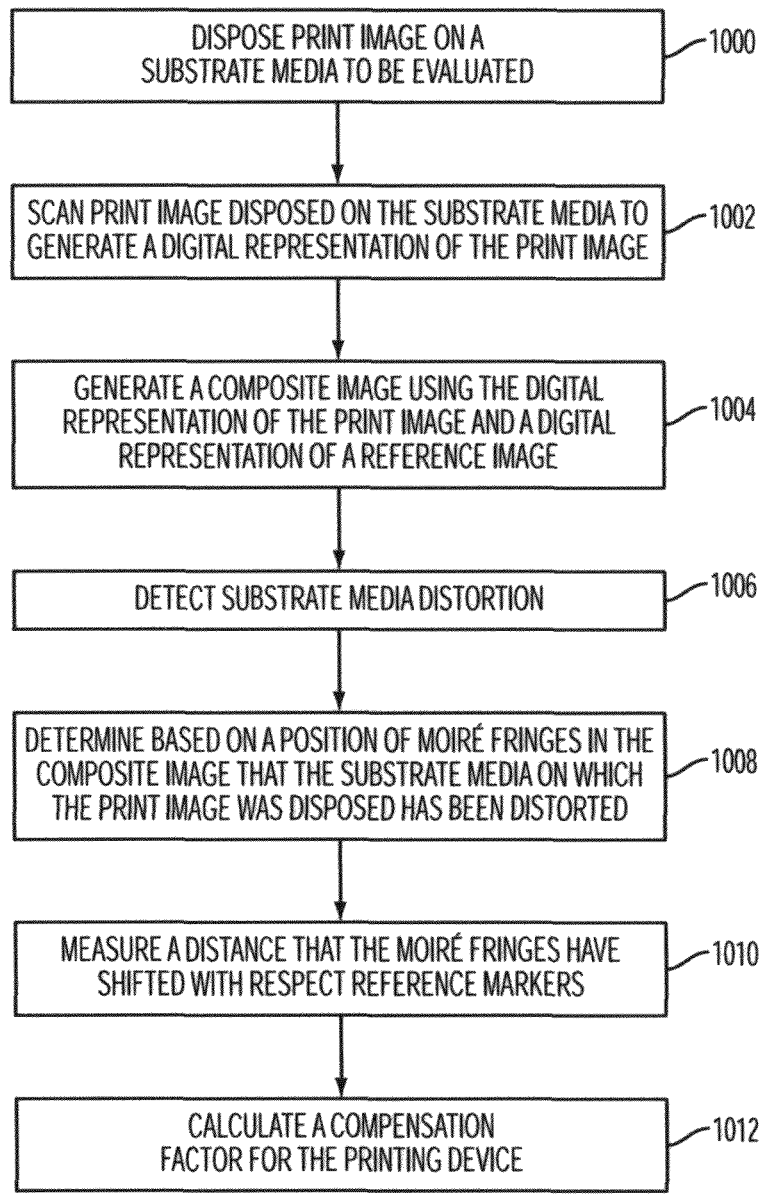
FIG. 10 is a flowchart illustrating an exemplary implementation of detecting and/or measuring substrate media distortion using a distortion detection and measurement tool.

FIG. 10 is a flowchart illustrating detection and measurement of substrate media distortion using a scanned print image. A print image can be disposed on a substrate media to be evaluated using a printing process implemented by a printing device (1000). The substrate media can be distorted during the printing process, and therefore, the print image can be distorted. The print image disposed on the substrate media can be scanned using a scanning device to generate a digital representation of the print image that is substantially identical to the print image disposed on the substrate media to be evaluated (1002). The scanning process can ensure that the digital representation of the print image can have a substantially identical test frequency and test period as that of the print image disposed on the substrate media to be evaluated.

A distortion detection and measurement tool can be implemented using a computing device to generate a composite image using the digital representation of the print image and a digital representation of a reference image stored in storage accessible by the tool (1004). To generate a composite image, the tool can programmatically overlay the digital representation of the reference image on the digital representation of the print image. In some embodiments, the composite image can be displayed on a display device to facilitate user interpretation of the composite image. In some embodiments, the tool can process the composite image without displaying the composite image. The reference image is used in conjunction with an undistorted print image are specified to generate a composite image for which the moiré fringes are centered about some of the reference markers in the composite image (e.g., the nominal case). As a result, when the print image has been distorted, the moiré fringes of the composite image are no longer centered about the reference markers.

Using position of the moiré fringes of the nominal case, the tool can detect substrate media distortion by detecting that one or more of the moiré fringes are not centered about the reference markers (1006). Based on the position of one or more of the moiré fringes, the tool can determine, for example, that the substrate media on which the print image was disposed has been distorted (e.g., stretched or shrunk) (1008). For example, if the moiré fringe has shifted inward towards the center point of the composite image as compared to the nominal case such that the moiré fringes are not centered about the reference markers, the tool can determine that the substrate media has shrunk, and if the moiré fringes have shifted outward away from the center point of the composite image such that the moiré fringes are not centered about the reference markers, the tool can determine that the substrate media has been stretched.

The tool can also measure a distance that the moiré fringes have shifted with respect reference markers (1010). The distance one or moiré fringes have shifted compared to the nominal case can be used by the tool to calculate a compensation factor for the printing device (1012). In some embodiments, the tool can programmatically apply a compensation factor the printing device to calibrate the printing device to compensate for the distortion of the substrate media as a result of the printing process. In some embodiments, the tool can generate a compensation factor, which can be displayed to a user, and the user can enter the compensation factor into the printing device to compensate for the substrate media distortion resulting from the printing process.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method for identifying substrate media distortion in a printing process comprising:
   identifying a reference image having a first periodic pattern formed by concentric circles;
   identifying a print image having a second periodic pattern formed by concentric circles, the print image being disposed on a test substrate media using a printing device, the printing device distorting the test substrate media, the distortion of the test substrate media distorting the print image; and
   generating a composite image from the reference image and the print image disposed on the test substrate media, the composite image including a moiré pattern having moiré fringes resulting from interference between the first periodic pattern associated with the reference image and the second periodic pattern associated with the print image, the moiré fringes being used to detect direction and amount of distortion of the test substrate media,
   wherein a position of moiré fringes in the composite image is related to an amount of the distortion of the test substrate media.

2. The method of claim 1, further comprising:
   disposing the reference image on a reference substrate media, the reference substrate media being transparent.

3. The method of claim 2, wherein generating a composite image comprises:
   overlaying the reference substrate media on the test substrate media; and
   aligning a reference marker included in the print image with a reference marker included in the reference image.

4. The method of claim 1, wherein generating the composite image comprises:
   generating a digital representation of the print image disposed on the test substrate media;
   storing the digital representation of the print image disposed on the test substrate media in storage;
   overlaying the reference image and the digital representation of the print image using a computing device; and
   aligning a reference marker included in the print image with a reference marker included in the reference image using the computing device.

5. The method of claim 1, further comprising:
   determining an amount of distortion of the test substrate media based on the position of the moiré fringe relative to a reference marker included in the reference image.

6. The method of claim 5, wherein determining the amount of distortion comprises:
   calculating a distance that the moiré fringe has shifted relative to the reference marker.

7. The method of claim 1, further comprising:
   calibrating the printing device to compensate for the distortion of the test substrate media.

8. A non-transitory computer readable medium storing instructions executable by a computing system including at least one computing device, wherein execution of the instructions implements a method for identifying substrate media distortion in a printing process comprising:
   identifying a reference image having a first periodic pattern formed by concentric circles;
   identifying a print image having a second periodic pattern formed by concentric circles, the print image being disposed on a test substrate media using a printing device, the printing device distorting the substrate media, the distortion of the test substrate media distorting the print image; and
   generating a composite image from the reference image and the print image disposed on the test substrate media, the composite image including a moiré pattern having moiré fringes resulting from interference between the first periodic pattern associated with the reference image and the second periodic pattern associated with the print image, the moiré fringes being used for calculating direction and amount of distortion of the test substrate media
   wherein a position of moiré fringes in the composite image is related to an amount of the distortion of the test substrate media.

9. The medium of claim 8, further comprising:
   disposing the reference image on a reference substrate media, the reference substrate media being transparent and substantially undistorted by the printing device.

10. The medium of claim 9, wherein generating a composite image comprises:
    overlaying the reference substrate media on the test substrate media; and
    aligning a reference marker included in the print image with a reference marker included in the reference image.

11. The medium of claim 8, wherein generating the composite image comprises:
    generating a digital copy of the test substrate media on which the print image is disposed;
    storing the digital copy of the test substrate media in storage; and
    overlaying the reference image on the print image test substrate media; and
    aligning a reference marker included in the print image with a reference marker included in the reference image.

12. The medium of claim 1, further comprising:
    determining an amount of distortion of the test substrate media based on the position of the moiré fringe relative to the reference marker included in the reference image and the print image.

13. The medium of claim 12, wherein determining the amount of distortion comprises:
    calculating a distance that the moiré fringe has shifted relative to the reference marker.

14. A composite substrate media structure comprising:
    a reference substrate media on which a reference image is disposed, the reference image having a first periodic pattern formed by concentric circles; and
    a test substrate media on which a print image is disposed, the print image having a second periodic pattern formed by concentric circles, the print image having been disposed on the test substrate media using a printing device, distortion of the test substrate media by the printing device causing distortion of the print image,
    wherein overlaying the reference substrate media and the test substrate media forms a composite image, the first periodic pattern and the second periodic pattern are specified to generate a moiré pattern having moiré fringe in the composite image, a position of the moiré fringe indicating direction and amount of the distortion of the test substrate media.

15. The substrate media structure of claim 14, wherein the reference substrate media is a transparency, and the test substrate media is a sheet of paper.

16. The substrate media structure of claim 14, wherein a reference frequency is specified for the first periodic pattern and a test frequency is specified for the print image, the reference frequency and the test frequency being specified so that the moiré fringe in the composite image generated using the reference image and the print image is centered about a reference marker included in the reference image when the print image is undistorted.

17. The substrate media structure of claim 14, wherein the first periodic pattern and the second periodic pattern are specified to facilitate detection distortion of the test substrate media in a process direction.

18. The substrate media structure of claim 14, wherein the first periodic pattern and the second periodic pattern are specified to facilitate detection of distortion of the test substrate media in a cross-process direction.

* * * * *